(12) United States Patent
Martin et al.

(10) Patent No.: US 9,529,801 B2
(45) Date of Patent: Dec. 27, 2016

(54) MULTIMEDIA ANALYSIS AND RECOMMENDATION GENERATION

(75) Inventors: Keith Dana Martin, Westborough, MA (US); David Paul Datta, Worcester, MA (US)

(73) Assignee: Bose Corporation, Framingham, MA (US)

(*) Notice: Subject to any disclaimer, the term of this patent is extended or adjusted under 35 U.S.C. 154(b) by 1108 days.

(21) Appl. No.: 13/074,293

(22) Filed: Mar. 29, 2011

(65) Prior Publication Data

US 2012/0254363 A1    Oct. 4, 2012

(51) Int. Cl.
G06F 15/16    (2006.01)
H04B 1/20    (2006.01)
G05B 19/00    (2006.01)
G06F 17/30    (2006.01)

(52) U.S. Cl.
CPC ............... *G06F 17/30029* (2013.01)

(58) Field of Classification Search
CPC ............... G06F 17/30; G06F 17/30017; G06F 17/30029
USPC ............... 709/219, 217; 340/4.4, 5.1
See application file for complete search history.

(56) References Cited

U.S. PATENT DOCUMENTS

| | | |
|---|---|---|
| 2003/0236582 A1 | 12/2003 | Zamir et al. |
| 2004/0225519 A1* | 11/2004 | Martin .................... 705/1 |
| 2005/0021470 A1 | 1/2005 | Martin et al. |
| 2011/0126114 A1 | 5/2011 | Martin et al. |

* cited by examiner

*Primary Examiner* — Tonia L Dollinger
*Assistant Examiner* — Adam Cooney
(74) *Attorney, Agent, or Firm* — Brian M. Dingman; Dingman IP Law, PC (57) ABSTRACT

A computer program product, tangibly embodied on a computer readable medium, includes instructions, which when executed by a data processor of a multimedia player, cause the data processor to determine first media content characteristics that characterize a user-specific collection of media content; compare the first media content characteristics with second media content characteristics that characterize a first set of external media content channels; and based on the results of the comparison, present identifiers of a subset of the first set of external media content channels on an interface of the multimedia player.

16 Claims, 7 Drawing Sheets

MULTIMEDIA ANALYSIS AND RECOMMENDATION GENERATION

CROSS-REFERENCE TO RELATED APPLICATIONS

This application is related to the U.S. patent application Ser. No. 13/074,307, entitled "Multimedia Analysis and Cluster Formation," filed concurrently with the present application, the contents of which are incorporated herein by reference.

BACKGROUND

For items that are tracks of music on a compact disc, for example, some CD players enable a user to indicate his preference by programming a sequence in which the tracks are to be played. When one track ends, the CD player selects the next track based on the programmed sequence.

Some music playing devices and software allow a user to indicate a preference for a type of music, jazz for example, and the device or software will play items of music of the selected type.

In some systems, a selection is made of a next track to be played based on rating information provided by a user or a listening audience, such as a thumbs up/thumbs down rating. Other systems offer an automatic play list feature in which music items are selected for play based on user answers to questions that indicate preferences for types of music. At least one online merchant infers a user's tastes based on music purchased by the user.

SUMMARY

In a general aspect, a computer program product, tangibly embodied on a computer readable medium, includes instructions, which when executed by a data processor of a multimedia player, cause the data processor to determine first media content characteristics that characterize a user-specific collection of media content; compare the first media content characteristics with second media content characteristics that characterize a first set of external media content channels; and based on the results of the comparison, present identifiers of a subset of the first set of external media content channels on an interface of the multimedia player.

Embodiments may include one or more of the following.

The user-specific collection of media content is stored on the multimedia player.

The identifiers of the media content of the user-specific collection are stored in association with one or more of the following: an identifier of the multimedia player, an identifier of an operator of the multimedia player, and an identifier of a user account associated with a media content provider.

The first set of external media content channels includes one or more broadcast programming streams, one or more personalized programming streams, or some combination thereof.

The product further includes instructions, which when executed by the processor of the multimedia player, cause the data processor to automatically store identifiers of at least some of the subset of the first set of external media content channels as preset settings of the multimedia player. The product further includes instructions, which when executed by the processor of the multimedia player, cause the data processor to store identifiers of at least some of the subset of the first set of external media content channels as preset settings of the multimedia player responsive to input received through an input interface of the multimedia player.

The product further includes instructions, which when executed by the processor of the multimedia player, cause the data processor to determine a location of the multimedia player; and identify, as the first set of external media content channels, a plurality of broadcast programming channels based at least in part on the determined location of the multimedia player.

The product further includes instructions, which when executed by the processor of the multimedia player, cause the data processor to accept an input representative of the location of the multimedia player. The input representative of the location of the multimedia player includes at least one of an input from a user, an input from a mobile telephone network, an input from a global positioning system (GPS) network, and a result of a reverse lookup of an IP address of the multimedia player.

The product further includes instructions, which when executed by the processor of the multimedia player, cause the data processor to determine the first media content characteristics based on first media content attributes associated with the user-specific collection of media content. The first media content attributes include, for each of a plurality of items of media content, at least one of a genre, an artist, a frequency with which the item of media content has been played, an explicit rating, an implicit rating, a track title, and a year of publication. The product further includes instructions, which when executed by the processor of the multimedia player, cause the data processor to determine the first media content characteristics by text matching between the first media content attributes and a set of possible first media content characteristics.

The product further includes instructions, which when executed by the processor of the multimedia player, cause the data processor to determine the second media content characteristics based on second media content attributes associated with the first set of external media content channels. The second media content attributes include, for each external programming stream of the first set, at least one of a genre, a schedule, an artist listing, and a playlist. The product further includes instructions, which when executed by the processor of the multimedia player, cause the data processor to determine the second media content characteristics by text matching between the second media content attributes and a set of possible second media content characteristics. The product further includes instructions, which when executed by the processor of the multimedia player, cause the data processor to request the second media content attributes from an information server via at least one of the Internet and a mobile telephone network.

The product further includes instructions, which when executed by the processor of the multimedia player, cause the data processor to identify the subset of the first set of external media channels based on the results of the comparison. The product further includes instructions, which when executed by the processor of the multimedia player, cause the processor to identify the subset of the first set of external programming streams based on an identification of the external media channels having associated second media content characteristics that are most similar to the first media content characteristics.

In another general aspect, a system includes a first media content module configured to determine first media content characteristics that characterize a user-specific collection of media content; a comparison module configured to compare the first media content characteristics with second media content characteristics that characterize a first set of external media content channels; and a presentation module configured to selectively, based on the results of the comparison, present identifiers of a subset of the first set of external media content channels on an interface of a multimedia player.

Embodiments may include one or more of the following.

The system further includes a preset storage module configured to store identifiers of at least some of the subset of the first set of external media content channels as preset settings of the multimedia player.

The system further includes a location module configured to determine a location of the multimedia player; and a second media content module configured to identify, as the first set of external media content channels, a plurality of broadcast programming streams based at least in part on the determined location of the multimedia player. The system further includes an input module configured to accept an input representative of the location of the multimedia player. The input module comprises at least one of a user interface configured to receive input from a user, a module configured to receive input from a mobile telephone network, a module configured to receive input from a global positioning system (GPS) network, and a module configured to receive a result of a reverse lookup of an IP address of the multimedia player.

The first media content module is further configured to determine the first media content characteristics based on first media content attributes associated with the user-specific collection of media content. The first media content attributes include, for each of a plurality of items of media content, at least one of a genre, an artist, a frequency with which the item of media content has been played, an explicit rating, an implicit rating, a track title, and a year of publication. The first media content module is further configured to determine the first media content characteristics by text matching between the first media content attributes and a set of possible first media content characteristics.

The system further includes a second media content module configured to determine the second media content characteristics on the basis of second media content attributes associated with the first set of external media content channels. The second media content attributes include, for each external programming stream of the first set, at least one of a genre, a schedule, an artist listing, and a playlist. The second media content module is further configured to determine the second media content characteristics by text matching between the second media content attributes and a set of possible second media content characteristics. The system further includes a communications module configured to request the second media content attributes from an information server via at least one of the Internet and a mobile telephone network.

The comparison module is configured to identify the subset of the first set of external programming streams based on the results of the comparison. The comparison module is further configured to identify the subset of the first set of external media channels based on an identification of the external media channels having associated second media content characteristics that are most similar to the first media content characteristics.

In a general aspect, a computer program product, tangibly embodied on a computer readable medium, comprising instructions, which when executed by a data processor of a multimedia player, cause the data processor to examine media content characteristics that characterize a user-specific collection of media content to identify a first cluster of media content that share similar media content characteristics; generate a first set of media content objects that characterize the first cluster of media content; and identify at least a subset of the first set of media content objects as potential seed objects for a set of media content channels.

Embodiments may include one or more of the following.

The product further includes instructions, which when executed by the processor of the multimedia player, cause the data processor to determine the first media content characteristics based on media content attributes associated with the user-specific collection of media content. The media content attributes include, for each of a plurality of items of media content, at least one of a genre, a style, an artist, a frequency with which the item of media content has been played, an explicit rating, an implicit rating, a track title, and a year of publication. The product further includes instructions, which when executed by the processor of the multimedia player, cause the data processor to determine the media content characteristics by text matching between the media content attributes and a set of possible media content characteristics.

The first set of media content objects includes one or more of the following: a media content identifier, a media content artist identifier, a channel-defined tag, and a user-defined tag.

The set of media content channels include one or more of the following: a personalized programming stream and a collection of music content that is a subset of the user-specific collection of media content.

The user-specific collection of media content is a subset of an available collection of media content that is not stored locally on the multimedia player.

The user-specific collection of media content is stored locally on the multimedia player.

The media content characteristics associated with the media content of the first cluster have a degree of similarity that exceeds a threshold value. The product further includes instructions, further comprising instructions, which when executed by the data processor of the multimedia player, cause the data processor to present a visual representation of a threshold value selector on a user interface of the multimedia player; and set the threshold value based on input received responsive to the presentation of the visual representation.

The instructions to identify at least the subset of the first set of media content objects as potential seed objects include instructions, which when executed by the data processor, cause the data processor to select a combination of media content objects that characterizes a diversity of the first cluster of media content. The product further includes instructions, which when executed by the data processor of the multimedia player, cause the data processor to present a visual representation of a media content diversity selector on a user interface of the multimedia player; and select the combination of media content objects based in part on input received responsive to the presentation of the visual representation.

The product further includes instructions, which when executed by the data processor of the multimedia player, cause the data processor to present a visual representation of the first set of media content objects on a user interface of the multimedia player; identify at least the subset of the first set of media content objects as potential seed objects based in part on input received responsive to the presentation of the visual representation.

The product further includes instructions, which when executed by the data processor of the multimedia player, cause the data processor to examine the media content characteristics that characterize the user-specific collection of media content to identify a second cluster of media content that share similar media content characteristics; generate a second set of media content objects that characterize the second cluster of media content; and identify at least a subset of the second set of media content objects as potential seed objects for a set of media content channels. The first set of media content objects and the second set of media content objects are mutually exclusive sets. The first set of media content objects and the second set of media content objects include at least one common media content object.

In another general aspect, a system includes a first media content module configured to examine media content characteristics that characterize a user-specific collection of media content to identify a first cluster of media content that share similar media content characteristics; and generate a first set of media content objects that characterize the first cluster of media content. The system further includes a seed identification module configured to identify at least a subset of the first set of media content objects as potential seed objects for a set of media content channels.

Embodiments may include one or more of the following.

The first media content module is further configured to determine the media content characteristic based on media content attributes associated with the user-specific collection of media content. The media content attributes include, for each of a plurality of items of media content, at least one of a genre, a style, an artist, a frequency with which the item of media content has been played, an explicit rating, an implicit rating, a track title, and a year of publication. The first media content module is further configured to determine the media content characteristics by text matching between the media content attributes and a set of possible media content characteristics.

The first set of media content objects includes one or more of the following: a media content identifier, a media content artist identifier, a channel-defined tag, and a user-defined tag.

The set of media content channels includes one or more of the following: a personalized programming stream and a collection of music content that is a subset of the user-specific collection of media content.

The user-specific collection of media content is a subset of an available collection of media content that is not stored locally on the multimedia player.

The media content characteristics associated with the media content of the first cluster have a degree of similarity that exceeds a threshold value.

The system further includes a presentation module configured to present a visual representation of a threshold value selector on a user interface of the multimedia player. The first media content module is configured to set the threshold value based on input received responsive to the presentation of the visual representation.

The seed identification module is further configured to select a combination of media content objects that characterizes a diversity of the first cluster of media content. The system further includes a presentation module configured to present a visual representation of a media content diversity selector on a user interface of the multimedia player. The seed identification module is configured to select the combination of media content objects based in part on input received responsive to the presentation of the visual representation.

The system further includes a presentation module configured to present a visual representation of the first set of media content objects on a user interface of the multimedia player, wherein the seed identification module is configured to identify at least the subset of the first set of media content objects as potential seed objects based in part on input received responsive to the presentation of the visual representation.

The first media content module is further configured to examine the media content characteristics that characterize the user-specific collection of media content to identify a second cluster of media content that share similar media content characteristics; and generate a second set of media content objects that characterize the second cluster of media content. The seed identification module is configured to identify at least a subset of the second set of media content objects as potential seed objects for a set of media content channels.

The systems and methods described herein include a number of advantages. For instance, the ability to identify streaming Internet radio or television stations that are well-matched to a listener's tastes saves the listener time and reduces the listener's frustration in attempting to locate appropriate media channels. The ability of the listener to contribute dynamically to the recommendation processes helps to ensure that the resulting recommendations will meet the listener's expectations.

Other features and advantages of the invention are apparent from the following description and from the claims.

DETAILED DESCRIPTION

Figure 1:
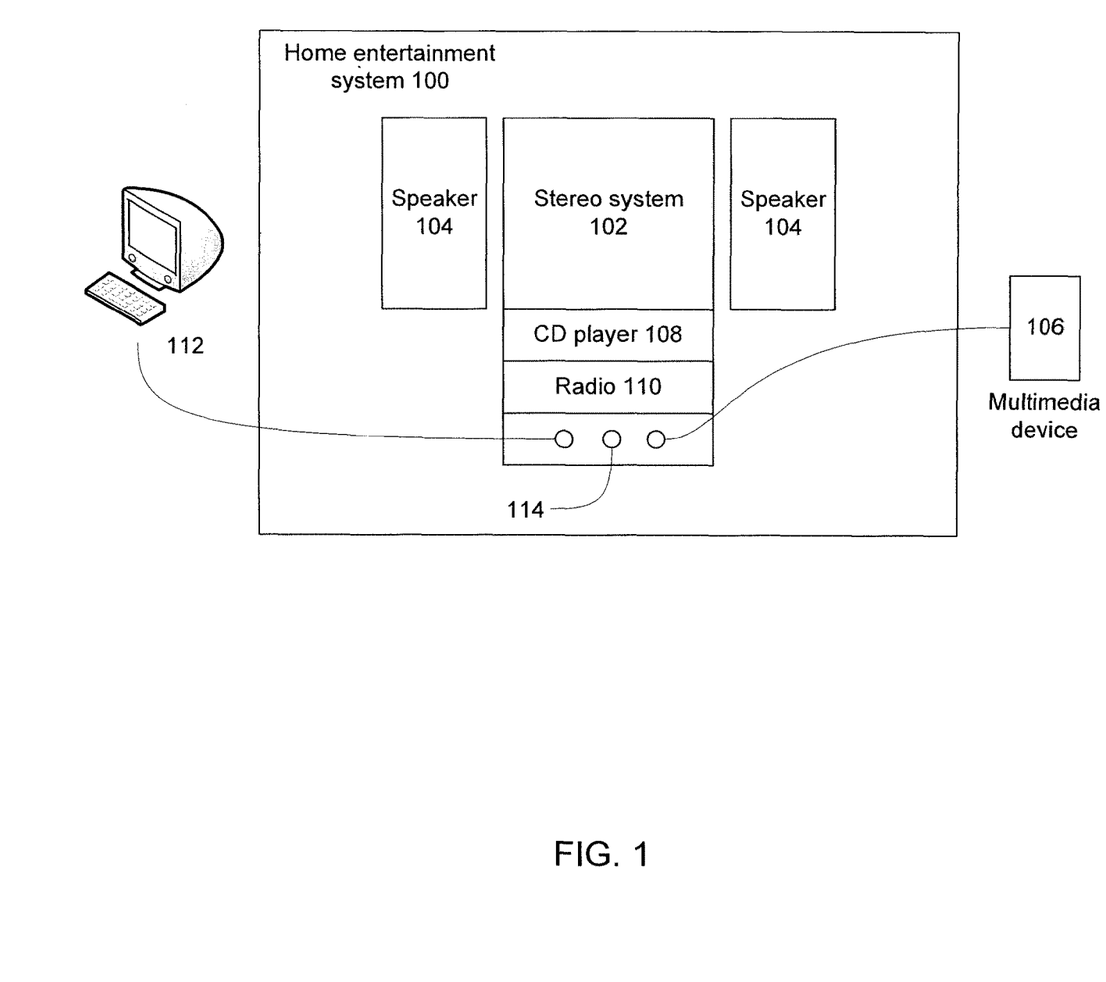
FIG. 1 is a diagram of a home entertainment system.

Referring to FIG. 1, a home entertainment system 100 includes a stereo system 102 for playing music through speakers 104. Stereo system 102 provides a connection for a portable multimedia player 106 such that music from a user's music collection stored on the multimedia player 106 can be played through speakers 104. Stereo system 102 may also provide the capability to play music from compact discs (CDs) 108 or broadcast radio stations 110. Home entertainment system 100 may include a link to a personal computer 112 on which is stored music and/or which may be used to stream music, e.g., through an Internet radio station. Home entertainment system 100 may also include its own Internet connection module 114 for streaming audio content.

1 Analysis of Media Characteristics

Figure 2:
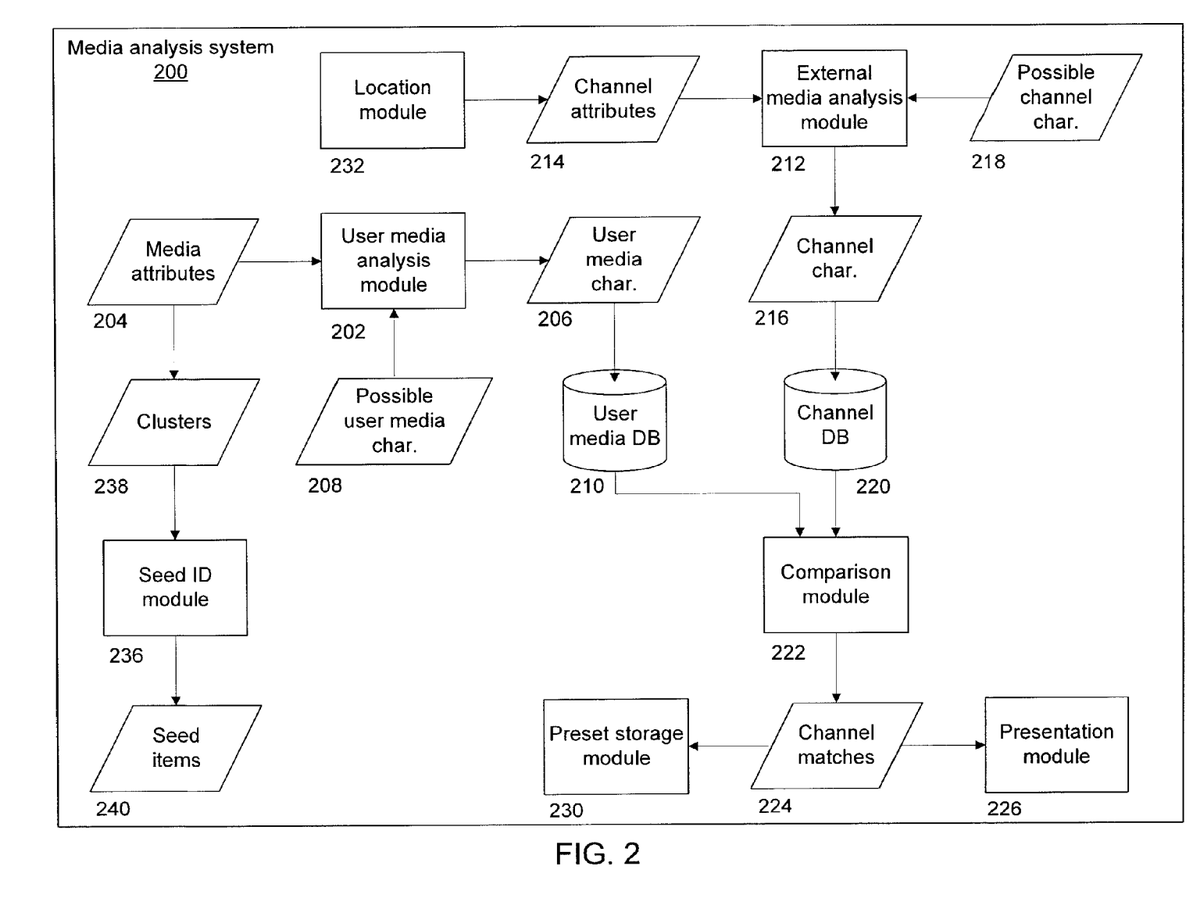
FIG. 2 is a block diagram of a media analysis system.
Figure 3:
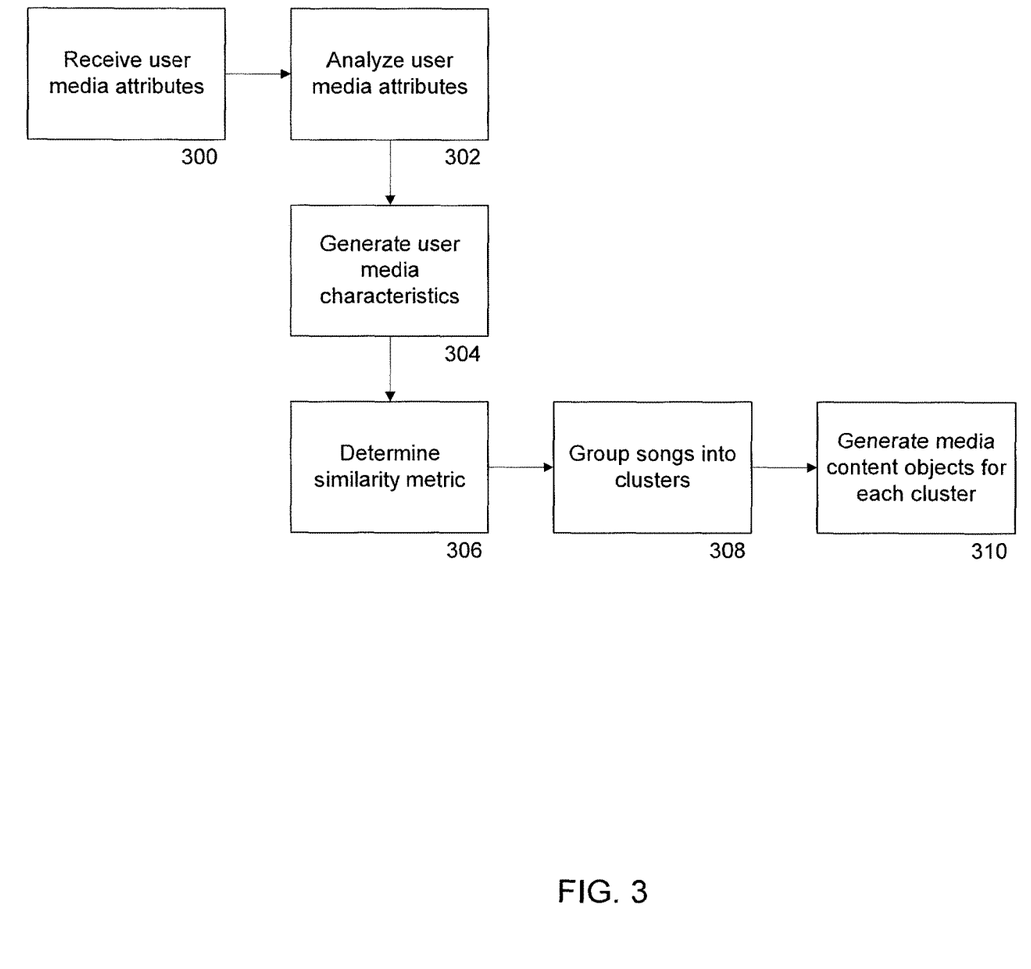
FIG. 3 is a media analysis flowchart.

Referring to FIGS. 2 and 3, in a media analysis system 200 integrated into multimedia player 106, a user media analysis module 202 characterizes the music collection stored on the multimedia player.

Specifically, media attributes 204, which include, e.g., the artist and genre of each track (e.g., each song) in the user's music collection, are received at user media analysis module 202 (step 300). Media attributes 204 may also include a track title and a year of publication. In some embodiments, media attributes 204 also include additional information about each song, such as a frequency with which the user has listened to the song over a period of time (e.g., within the last week or month), an explicit rating of the song by the user (e.g., a number of stars or a thumbs up/thumbs down rating), or an implicit rating of the song by the user based on the user's past actions toward the song (e.g., skipping the song or frequently playing the song).

User media analysis module 202 analyzes user media attributes 204 (step 302) to generate a set of user media characteristics 206 that characterize the music included in the user's music collection (step 304). User media characteristics may include, for instance, rich metadata representative of genre, style, or associated artists. In some instances, the set of user media characteristics 206 is generated by text matching between user media attributes 204 and a set of possible user media characteristics 208. In some cases, the set of user media characteristics 206 is stored in a user media database 210.

2 Cluster Formation

Referring still to FIGS. 2 and 3, user media analysis module 202 groups music in the user's music collection into clusters 238 based on similarities between tracks. Based on the content of the clusters, recommendation seeds are generated that can act as seeds for the generation of personalized programming streams by, e.g., personalized Internet radio stations. Recommendation seeds may also act as seeds for the generation of a personalized playlist including some or all of the music in the user's music collection stored on multimedia player 106.

2.1 Similarity Metrics

To group the user's music into clusters, a similarity metric is first determined between each track and each other track in the user's music collection (step 306).

In one embodiment, a similarity metric determines the similarity between two artists based on metadata (i.e., textual information) associated with the artist and/or with a song performed by the artist. For instance, one source of metadata is the All Music Guide (AMG), which assigns each artist to a list of similar artists, with connection strengths ranging from 1 to 10 representative of a similarity between each pair of artists on the list. Each artist is also assigned to one or more style groups, with connection strengths representative of the strength of the connection between the artist and the style group to which the artist is assigned. Each style is assigned to a genre, and may also be assigned to one or more metastyles, with connection strengths representative of the strength of the connection between the style and the respective metastyle and genre.

Figure 4:
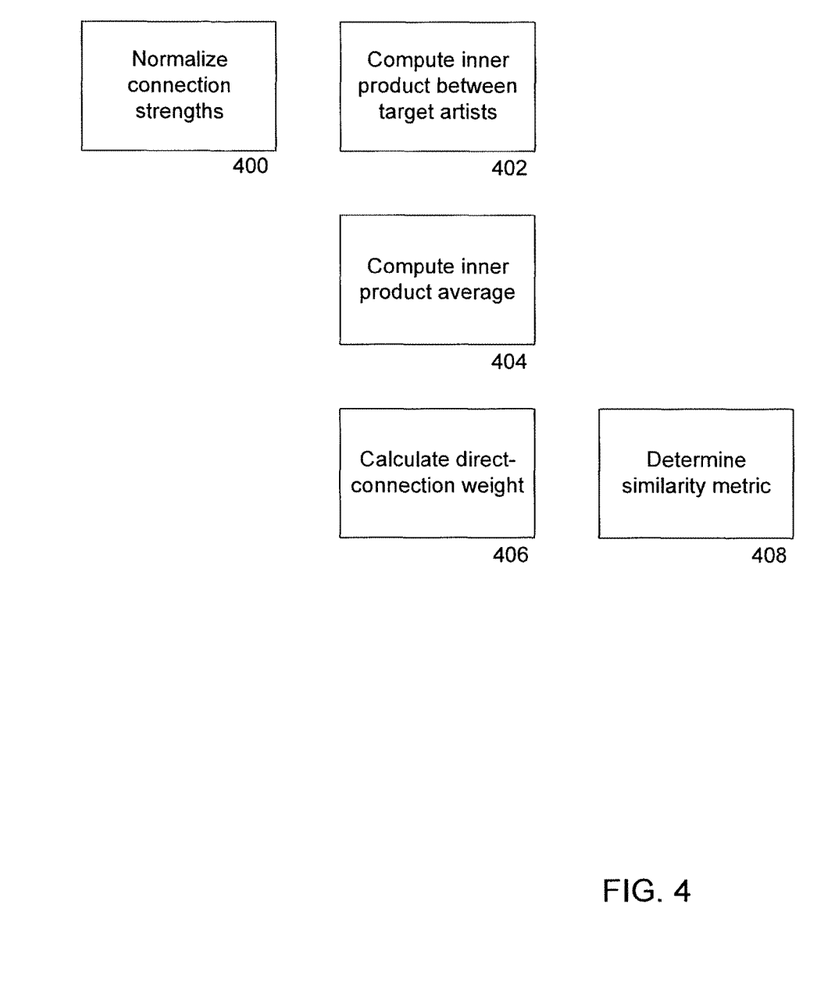
FIG. 4 is a flowchart of a process to determine artist similarity.

Referring to FIG. 4, for each artist, the style, metastyle, and genre connection strengths are normalized (step 400) such that the sum of the squares of each level (i.e., style, metastyle, genre) is 1.0. Considering the normalized strengths as non-zero entries in a vector of all possible styles, metastyles, or genres, the inner product between the feature vectors of two target artists is computed (step 402). By construction, the inner product of features for an artist with itself is 1.0; two artists who share no styles, metastyles, or genres will have an inner product of zero. The three inner products are averaged, generating an inner product average (step 404).

A direct-connection weight between the two target artists is calculated (step 406) as follows: If the two artists are identical, the direct-connection weight is 1.0. If one artist appears in the other artist's list of similar artists, the direct-connection weight is the connection strength divided by 10. Otherwise, if the lists of similar artists for both target artists include at least one of the same artists, the direct-connection weight is 0.3.

The similarity metric is determined based on the average of the inner product average (calculated in step 404) and the direct-connection weight (step 408).

2.2 Cluster Creation

Referring again to FIG. 3, songs that have a degree of similarity that exceeds a threshold value are grouped into a cluster (step 308). A complete set of clusters for a given music collection include all of the music in the music collection.

Figure 5:
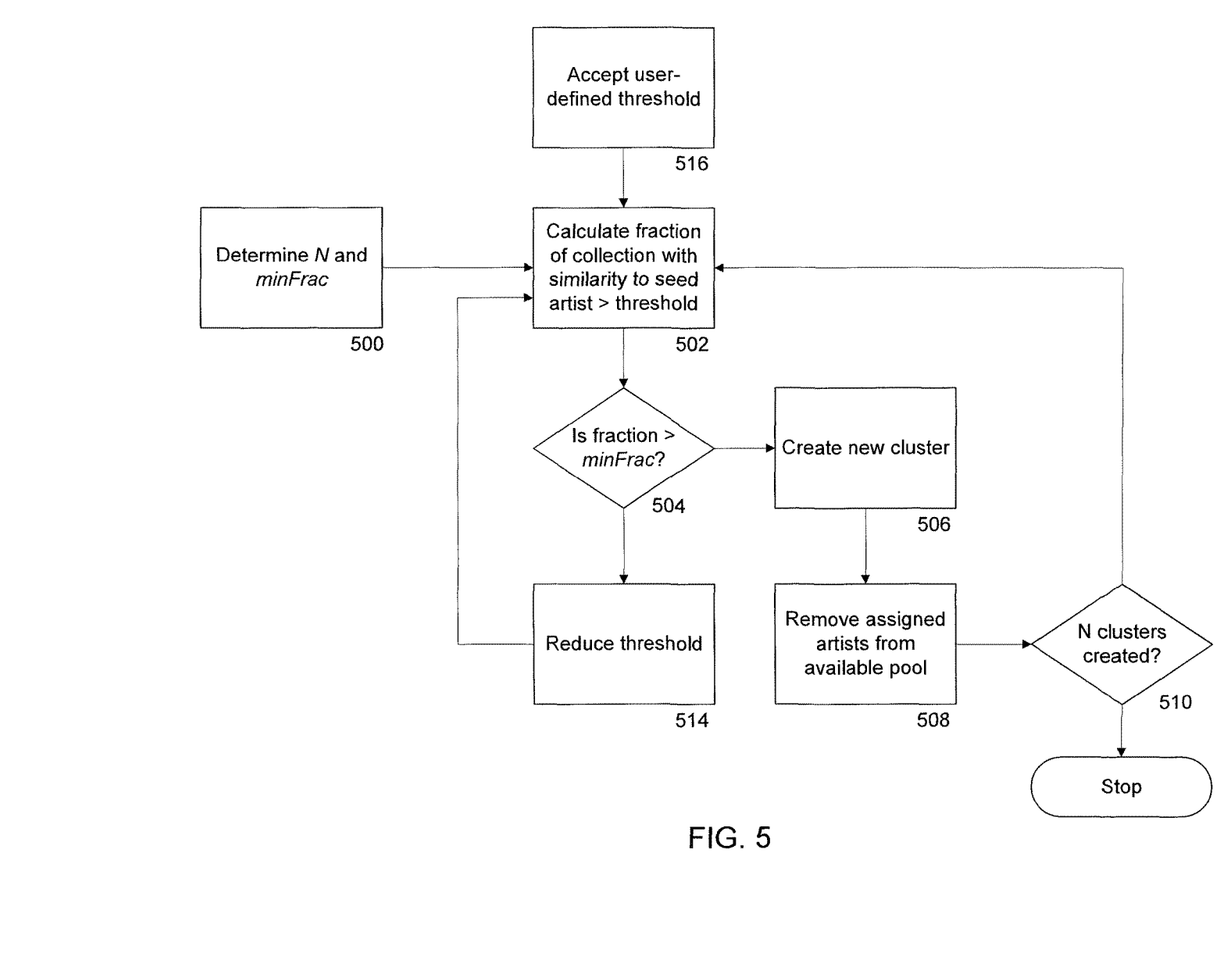
FIG. 5 is a flowchart of a cluster creation process.

Referring to FIG. 5, in one embodiment, a target number of clusters (N) and a minimum size for each cluster, expressed as a fraction of the total music collection (minFrac), are determined (step 500). The set of all available artists in the user's music collection is treated as the initial available pool, and a threshold variable is set to a maximum value (e.g., 0.95).

Using each artist in the available pool in turn as a seed artist, the media analysis module 202 calculates what fraction of the user's music collection is at least as similar to the seed artist as the threshold value (step 502). If the largest fraction is greater than minFrac (step 504), a new cluster is created including the seed artist associated with that largest fraction and all other artists that are at least as similar to the seed artist as the threshold value (step 506). The artists assigned to the newly created cluster are removed from the available pool (step 508) and the process is repeated, provided N clusters have not yet been created (step 510). If no fraction is greater than minFrac, the threshold is reduced by a small, fixed amount (step 514) and the seed artist similarity comparison is performed again.

In some embodiments, the user indicates the desired degree of similarity between artists in a cluster using a threshold value selector (e.g., a slider bar) displayed on a user interface of the multimedia player (step 516). Cluster statistics, such as the artists included in each cluster and the total number of artists and tracks included in each cluster, may be displayed to the user as the user adjusts the threshold value. In some cases, the user may be provided with the ability to exclude individual artists from the overall cluster formation process and/or from a particular cluster.

In an alternative embodiment, the user identifies the seed artist and media analysis module 202 constructs a cluster around the user-identified seed artist.

In some cases, clusters are mutually exclusive sets of songs; that is, each song in the user's collection is included in only one cluster. In other cases, songs may be included in multiple clusters.

2.3 Cluster Characterization

Referring again to FIGS. 2 and 3, media analysis module 202 generates a set of media content objects characterizing each cluster (step 310). A media content object is, in general, a label that describes some or all of the music in a cluster. For instance, a media content object may be a track name, an album name, an artist, a band, a genre, a style, or another attribute or characteristic of the music in the cluster. A media content object may also be a user-defined tag or an externally defined tag (e.g., a tag applied by an Internet radio station). In some embodiments, each set of media content objects characterizing each cluster is mutually exclusive of each other set of media content objects characterizing each other cluster. In other embodiments, overlap in media content objects between clusters is permitted.

In one embodiment, media analysis module 202 creates a user-specific label for each cluster based on metadata associated with the songs in the cluster. Media analysis module 202 identifies metadata and/or other tags that best describe the songs within a particular cluster but that apply minimally or not at all to songs outside the cluster.

Figure 6:
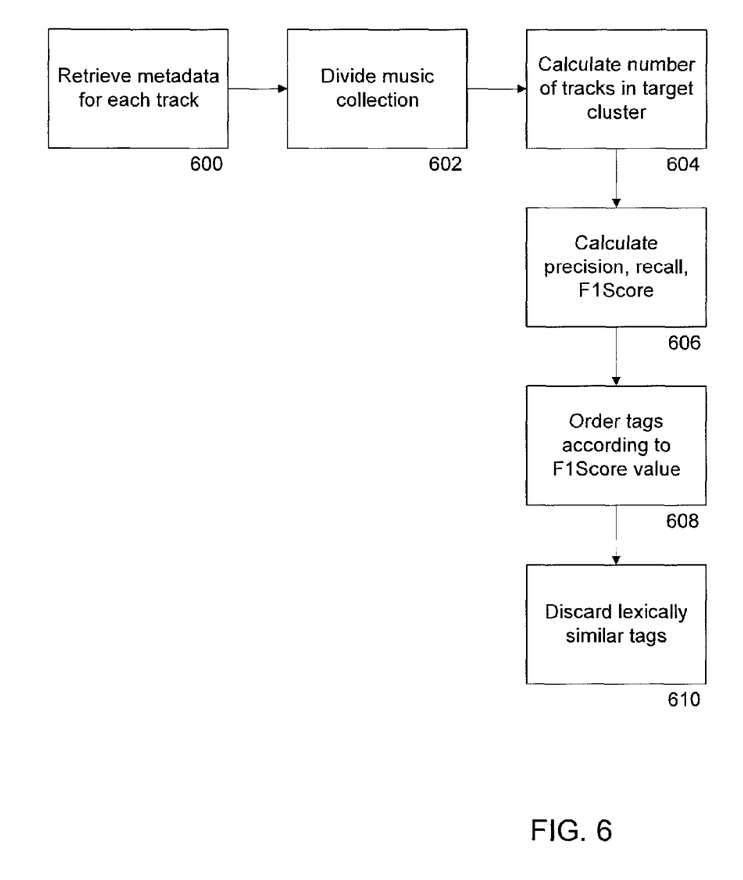
FIG. 6 is a flowchart of a cluster labeling process.

Referring also to FIG. 6, for each track in the user's music collection, media analysis module 202 retrieves a list of tags and other metadata associated with that track and its artist (e.g., from last.fm, AMG, or The Echo Nest; step 600). In some cases, the tags are entered by the user or by other users of last.fm or another similar service. User-entered tags in general are descriptive of the music but contain a high level of noise.

The user's music collection is then divided into two parts: the target cluster for which a label is to be generated and music outside of that target cluster (step 602). The number of tracks in the target cluster is calculated and stored in association with the variable name NumberOfTracksInCluster (step 604).

For each tag, the following values are calculated (step 606):
NumberOfTracksInClusterWithTag and
NumberOfTracksInWholeCollectionWithTag (by definition, the latter is greater than the former)
Precision=NumberOfTracksInClusterWithTag/NumberOfTracksInCluster
Recall=NumberOfTracksInClusterWithTag/NumberOfTracksInWholeCollectionWithTag
F1Score=2*(Precisioon*Recall)/(Precision+Recall)

The tags are then ordered by their associated F1Score value; the three top tags are selected (step 608), discarding any tags that are lexically too similar to tags that have already been assigned as labels for other clusters (step 610). For instance, lexical similarity may be determined by a threshold string edit distance (i.e., minimum number of characters added and deleted in order to change one string to the other, divided by the average length of the two strings). Thus, in one example, if "Indie" has already been assigned as a label for a cluster, the label "Indie pop" may be rejected as another label for that same cluster.

Using this process, a list of labels is associated with each cluster to describe how the cluster is differentiated from the other music in the user's collection. In some cases, the labels describe broad genres; in other cases, the labels describe narrow styles.

2.4 Selection of Recommendation Seeds

Referring again to FIG. 2, a seed identification module 236 selects a subset of the media content objects of one or more clusters to act as seed items 240 for a recommendation engine. For instance, the selected media content objects may act as seed objects for a personalized Internet radio station (e.g., Pandora). Alternatively, the selected media content objects may act as seed objects for the selection of a subset of the user's own collection of music.

In one example, seed identification module 236 selects as the seed the artist at the "center" of the cluster; that is, the artist with the highest degree of similarity to each other artist in the cluster. In other examples, seed identification module 236 selects one or more artists distributed through the space of the cluster.

In some embodiments, seed identification module 236 identifies seed items based at least in part on user input. For instance, a list of potential seed items characterizing one or more clusters may be presented to the user, and the user may select the seed item(s) that best reflect the user's interests or preferences. The user may also specify a "negative seed;" for instance, the user may wish to seed a recommendation engine to obtain music similar to Sting but without any music by The Police.

In some embodiments, the user can indicate a desired degree of diversity in the recommendations that will be obtained from a recommendation engine using a diversity value selector (e.g., a slider bar) displayed on a user interface of the multimedia player. Diversity is not necessarily limited to diversity in genre. For instance, if seed identification module 236 selected the media content object "female country singer-songwriter" as a potential seed object, and the user specified a high degree of diversity in the resulting recommendations, the seed identification module may determine the final seed object to be "female vocalist."

In some embodiments, the clusters themselves are used as playlists characterized by the associated media content objects and/or by the recommendation seed(s) representative of the cluster.

3 Recommendation Generation

Based on the user's taste in music as characterized by media characteristics 206, the media analysis system identifies media channels (e.g., Internet-streaming radio stations) that may be of interest to the user.

Figure 7:
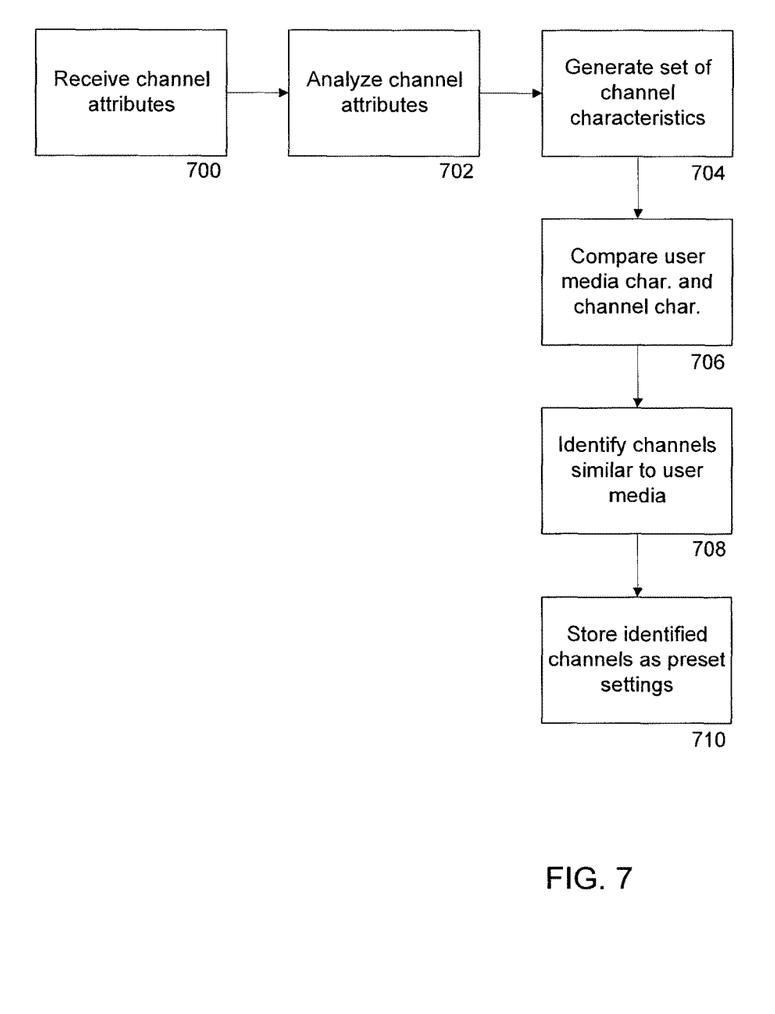
FIG. 7 is a flowchart of a media recommendation process.

Referring to FIGS. 2 and 7, an external media analysis module 212 receives channel attributes 214 associated with a set of available media channels (step 700). Channel attributes include, for each of the available media channels, attributes such as a genre, a programming schedule (e.g., the times of day or days of the week at which particular genres are played), an artist listing (e.g., a rank-ordered listing of the top artists played), a playlist (e.g., a playlist for the past day, week, month, or other period of time), and/or a frequency with which artists and/or songs are played.

External media analysis module 212 analyzes channel attributes 214 (step 702) to generate a set of channel characteristics 216 that characterize each available media content channel (step 704). Channel characteristics may include, for instance, rich metadata representative of genre, style, or associated artists. In some instances, the set of channel characteristics is generated by text matching between channel attributes 214 and a set of possible channel characteristics 218. In some cases, the set of channel characteristics 216 is stored in a channel database 220.

A comparison module 222 compares user media characteristics 206 (i.e., characteristics associated with the user's media collection) and channel characteristics 216 (i.e., characteristics associated with a set of available Internet radio stations; step 706). The channels having associated channel characteristics 216 that are most similar to the user media characteristics 206, e.g., based on a fitness metric calculated as a result of the comparison, are identified as channel matches 224 (step 708). A presentation module 226 presents the identified channel matches 224 to the user via a user interface, such as a display screen of the user's portable multimedia player 106. In other embodiments, the identified channel matches are made available to a remote application, such as an Internet browser on a mobile phone, tablet computing device, or laptop or desktop computer, via a communications interface of the multimedia player 106.

In some embodiments, a preset storage module 230 programs at least some of the identified channel matches 224 as preset settings of the user's multimedia player (step 710), either automatically or in response to an instruction from the user.

In general, the process of identifying channel matches is performed once, e.g., when media analysis system 200 first encounters the user's multimedia player. The identification of channel matches is not repeated unless a triggering event occurs. A repeat of the selection process may be triggered, for instance, by the user manually overriding one of the selections (e.g., selecting a channel not included in the set of channel matches or manually setting a preset setting to override one of the programmed channel matches). This manual override may suggest that the system-identified channels did not accurately reflect the user's tastes or preferences.

In some embodiments, the recommendation process is performed for multiple categories of music. For instance, the user's music collection has been grouped into clusters, a set of media channels may be identified for each cluster. In other embodiments, the recommendation process is performed using playlists formed of the user's music collection in place of the above-described media channels.

In one embodiment, the media content channels are broadcast radio stations. In this embodiment, a location module 232 determines the current location of the user's multimedia player. For instance, the current location may be determined using input from a global positioning system (GPS), a user interface through which the user can input the current location (e.g., a ZIP code or city name), a mobile telephone antenna that communications with mobile telephone transmission towers, or a reverse lookup of an IP address of the multimedia player.

Location module 232 communicates with a channel information server, e.g., over a wireless Internet connection or a mobile telephone network, to obtain a list of broadcast radio stations that are available for the current location. Channel information server 234 is generally a third-party entity and is not affiliated with any particular radio station.

In this embodiment, preset storage module 230 programs at least some of the identified channel matches 224 as preset radio settings. A repeat of the selection process may be triggered, for instance, when the multimedia player is moved out of range of one or more of the preset broadcast radio stations. In some cases, the repeat is triggered when an entirely new selection of local broadcast radio stations is available. In other cases, the repeat selection process is performed incrementally, and each radio station is replaced individually as it fades out of range. In embodiments in which preset storage module 230 programs Internet radio stations, the repeat selection process may be performed when one or all of the programmed radio stations are simulated to have faded out of range.

4 Alternative Embodiments

Although the systems and methods described above follow the example of a music collection stored on a user's multimedia player, the use of such systems and methods is not limited to this example. In some instances, the user's music collection may be stored elsewhere (e.g., on a personal laptop or desktop computer hard drive or online in association with a user account). In other instances, the user's music collection may be a tracking of tracks and/or stations of an online radio station service (e.g., last.fm or Pandora) that a user recently listened to and/or liked, disliked, or excluded.

In some embodiments, other media collections, such as a video collection, are analyzed as described above, and recommendations are made for, e.g., streaming Internet television channels that are most similar to the user's video or multimedia collection.

In some embodiments, media analysis system 200 is integrated into the multimedia player 106. In other embodiments, media analysis system 200 is implemented as software executable by a personal computer. In still other embodiments, the media analysis system is integrated into a home entertainment system, a car stereo system, or another entertainment system.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It is to be understood that the foregoing description is intended to illustrate and not to limit the scope of the invention, which is defined by the scope of the appended claims. Other embodiments are within the scope of the following claims.

What is claimed is:

1. A computer program product, tangibly embodied on a non-transitory computer readable medium, comprising instructions, which when executed by a data processor of a multimedia player, cause the data processor to:
   determine first media content characteristics that characterize a user-specific collection of media content, including determining the first media content characteristics based on first media content attributes associated with the user-specific collection of media content, the determining including text matching between the first media content attributes and a set of possible first media content characteristics;
   compare the first media content characteristics with second media content characteristics that characterize a first set of external streaming media content channels; and
   based on the results of the comparison, present identifiers of a subset of the first set of external streaming media content channels on an interface of the multimedia player.

2. The product of claim 1, wherein the user-specific collection of media content is stored on the multimedia player.

3. The product of claim 1, wherein identifiers of the media content of the user-specific collection are stored in association with one or more of the following: an identifier of the multimedia player, an identifier of an operator of the multimedia player, and an identifier of a user account associated with a media content provider.

4. The product of claim 1, wherein the first set of external media content channels includes one or more broadcast programming streams, one or more personalized programming streams, or some combination thereof.

5. The product of claim 1, further comprising instructions, which when executed by the processor of the multimedia player, cause the data processor to:
   store identifiers of at least some of the subset of the first set of external media content channels as preset settings of the multimedia player.

6. The product of claim 1, wherein the first media content attributes include, for each of a plurality of items of media content, at least one of a genre, an artist, a frequency with which the item of media content has been played, an explicit rating, an implicit rating, a track title, and a year of publication.

7. The product of claim 1, further comprising instructions, which when executed by the processor of the multimedia player, cause the data processor to determine the second media content characteristics based on second media content attributes associated with the first set of external media content channels.

8. The product of claim 7, wherein the second media content attributes include, for each external programming stream of the first set, at least one of a genre, a schedule, an artist listing, and a playlist.

9. The product of claim 7, further comprising instructions, which when executed by the processor of the multimedia player, cause the data processor to determine the second media content characteristics by text matching between the second media content attributes and a set of possible second media content characteristics.

10. The product of claim 1, further comprising instructions, which when executed by the processor of the multimedia player, cause the data processor to identify the subset of the first set of external programming streams based on an identification of the external media channels having associated second media content characteristics that are most similar to the first media content characteristics.

11. A system comprising:
   a first media content module configured to determine first media content characteristics that characterize a user-specific collection of media content, including determining the first media content characteristics based on first media content attributes associated with the user-specific collection of media content, the determining including text matching between the first media content attributes and a set of possible first media content characteristics;
   a comparison module configured to compare the first media content characteristics with second media content characteristics that characterize a first set of external streaming media content channels; and
   a presentation module configured to selectively, based on the results of the comparison, present identifiers of a subset of the first set of external streaming media content channels on an interface of a multimedia player.

12. The system of claim 11, further comprising a preset storage module configured to store identifiers of at least some of the subset of the first set of external media content channels as preset settings of the multimedia player.

13. The system of claim 11, further comprising:
   a location module configured to determine a location of the multimedia player; and
   a second media content module configured to identify, as the first set of external media content channels, a plurality of broadcast programming channels based at least in part on the determined location of the multimedia player.

14. The system of claim 11, further comprising a second media content module configured to determine the second media content characteristics based on second media content attributes associated with the first set of external media content channels.

15. The system of claim 11, wherein the comparison module is configured to identify the subset of the first set of external media channels based on the results of the comparison.

16. The system of claim 15, wherein the comparison module is further configured to identify the subset of the first set of external media channels based on an identification of the external media channels having associated second media content characteristics that are most similar to the first media content characteristics.

\* \* \* \* \*